United States Patent [19]
Mitarai et al.

[11] Patent Number: 5,736,822
[45] Date of Patent: Apr. 7, 1998

[54] VIBRATION WAVE MOTOR

[75] Inventors: Reiji Mitarai, Hachioji; Hiroaki Takeishi, Yokohama; Isao Iwai, Kodaira, all of Japan

[73] Assignee: Canon Kabushiki Kaisha, Tokyo, Japan

[21] Appl. No.: 635,216

[22] Filed: Apr. 17, 1996

Related U.S. Application Data

[63] Continuation of Ser. No. 253,563, Jun. 3, 1994, abandoned.

[30] Foreign Application Priority Data

Jun. 4, 1993 [JP] Japan .................. 5-134604

[51] Int. Cl.$^6$ .................................. H01L 41/08
[52] U.S. Cl. .......................... 318/116; 310/316
[58] Field of Search ................... 310/316, 317, 310/323; 318/116

[56] References Cited

U.S. PATENT DOCUMENTS

| | | | |
|---|---|---|---|
| 4,727,276 | 2/1988 | Izukawa | 310/316 |
| 4,749,896 | 6/1988 | Suzuki et al. | 310/316 |
| 4,888,514 | 12/1989 | Takahashi et al. | 318/316 |
| 4,954,742 | 9/1990 | Izukawa | 310/316 |
| 4,998,048 | 3/1991 | Furutsu | 318/116 |
| 5,013,982 | 5/1991 | Sasaki | 318/114 |
| 5,130,619 | 7/1992 | Izuno | 318/116 |
| 5,136,215 | 8/1992 | Izukawa | 318/116 |
| 5,155,418 | 10/1992 | Kataoka | 318/116 |
| 5,159,223 | 10/1992 | Suganuma | 310/316 |
| 5,159,253 | 10/1992 | Shimizu | 318/606 |
| 5,165,047 | 11/1992 | Shimizu | 318/116 |
| 5,173,630 | 12/1992 | Tanaka | 310/316 |
| 5,198,732 | 3/1993 | Morimoto | 318/116 |
| 5,258,694 | 11/1993 | Ohnishi et al. | 310/316 X |
| 5,285,134 | 2/1994 | Kataoka | 318/116 |
| 5,365,139 | 11/1994 | Kasuga | 310/316 |

*Primary Examiner*—Mark O. Budd
*Attorney, Agent, or Firm*—Fitzpatrick, Cella, Harper & Scinto

[57] ABSTRACT

This invention relates to a vibration wave motor which forms a vibration wave on a vibrating member by applying frequency signals having a phase difference therebetween to electro-mechanical energy conversion elements, and uses the vibration wave as a driving force. This invention provides a motor apparatus in which a disturbance component input to the motor apparatus is estimated based on input and output signals to the motor, and the estimated disturbance component is negatively fed back, thereby eliminating the influence of a disturbance.

4 Claims, 7 Drawing Sheets

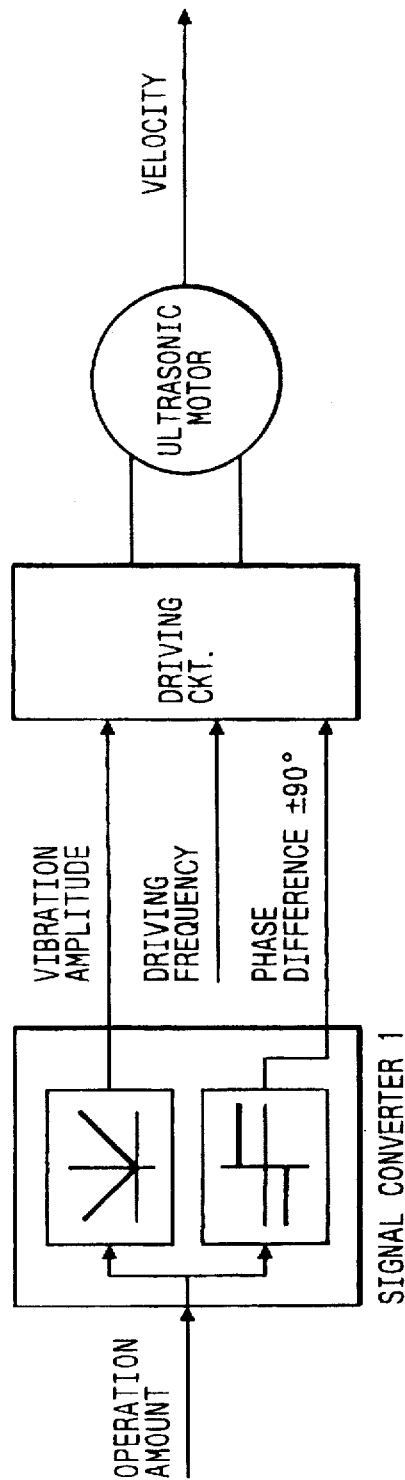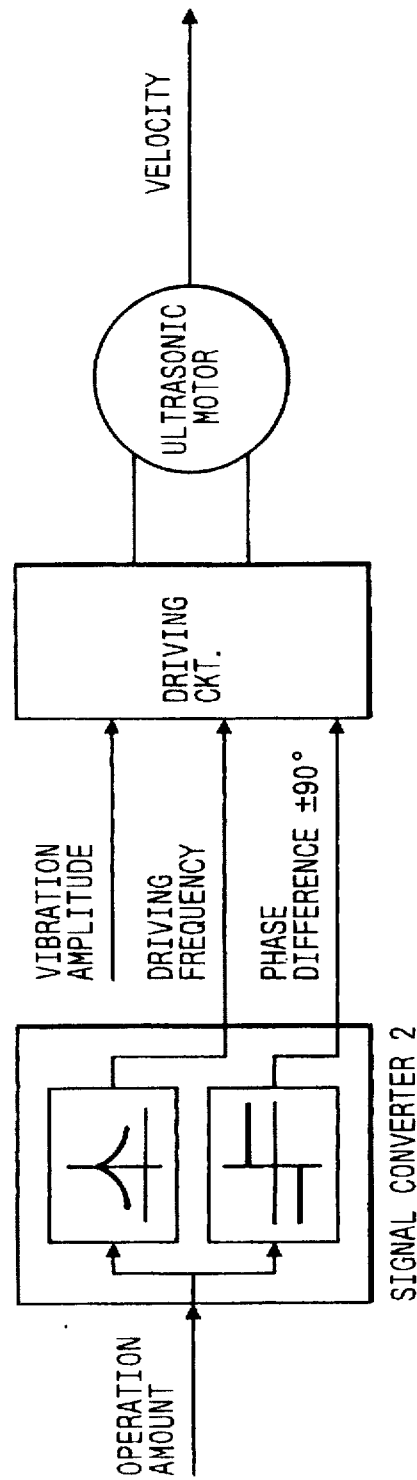

VIBRATION WAVE MOTOR

This application a continuation of application Ser. No. 08/253,563 filed Jun. 3, 1994, now abandoned.

BACKGROUND OF THE INVENTION

1. Field of the Invention

The present invention relates to a control method for improving position control or velocity control of a motion control system having nonlinear characteristics and, more particularly, to a control apparatus for a vibration wave motor, which improves and controls performance and maintains constant control performance for a system having dead band characteristics or characteristic variations like in a motion control system using a travelling wave type vibration wave motor.

2. Related Background Art

An arrangement associated with a connection between a control arithmetic value and a driving circuit used as a control system arrangement of all vibration wave motors will be described below. FIGS. 2A and 2B show examples of the connection arrangement. This arrangement is one for applying a linear control theory to a vibration wave motor control system, and is a basic arrangement for performing motor control by combining a speed variable operation amount and a direction change operation into a single operation amount or value in a real number input space. A signal converter in each of FIGS. 2A and 2B serves this function, and operation methods based on the vibration amplitude and driving frequency used as typical speed change variables respectively correspond to FIGS. 2A and 2B. In either arrangement, the phase difference of a two-phase oscillator in a driving circuit is switched to one of ±90° in correspondence with the sign of the operation amount input to the signal converter, i.e., the output value of a control characteristic compensation calculation. The absolute value of the operation amount is input to the driving circuit as a vibration amplitude command in the method shown in FIG. 2A, or as a driving frequency command in the method shown in FIG. 2B. In the method shown in FIG. 2B, since the relationship between the driving frequency and the motor velocity is controlled by mechanical system resonance characteristics and becomes nonlinear, a proper definition region is defined, and the signal converter is designed so that the above-mentioned relationship has an inverse function pattern. When the above-mentioned means is used, an input variable to a controlled object can be processed as a real number, and can be apparently processed linearly and continuously including a change in sign, i.e., switching of the operation direction.

FIG. 3 shows a typical arrangement of the prior art. The arrangement shown in FIG. 3 adopts a simple nest structure of a velocity control loop and a position control loop, and can be considered to be similar to a conventional AC/DC servo.

The characteristics of a controlled object 10 comprising an object to be driven, a vibration wave motor, and its driving circuit can be substantially represented by a nonlinear function 11 and a linear transfer function 12. The feature of this system lies in a nonlinear portion, and this portion expresses dead band characteristics on a control transmission path. The "dead band" here means a region where no output is obtained in response to an operation input, and corresponds to characteristics appearing as a lost motion phenomenon in a low-frequency range. Since the vibration wave motor is driven based on a frictional driving principle, the motor main body itself has a dead band in addition a backlash of a mechanism, and the lost motion characteristics should be overcome from the point of view of driving control means.

In the inner velocity feedback loop, a circuit having integral characteristics is adopted as a velocity compensator 7 to cope with a nonlinear component of the controlled object and any disturbance from the environment by, e.g., a PI (proportional term+integral term) calculation. When position control is performed, a position compensator 6 is arranged outside the velocity feedback loop to close the feedback loop of a position signal.

A problem in such a prior art is pointed out to be in positioning response characteristics. FIGS. 4A and 4B show typical step response waveforms. FIG. 4A shows the waveform of the conventional system, and FIG. 4B shows the waveform according to an embodiment of the present invention (to be described later). In the conventional system, a delay time appears in the early stage of the startup operation, and this impairs the response characteristics very much. This delay time is associated with the growth time of an integral variable required before the operation amount escapes from the dead band.

Furthermore, in the conventional system, a state wherein the rising gradient is small and disturbs a quick increase in actual velocity is observed. Such a state occurs since it is difficult to assure stability due to a disturbance or nonlinearity which cannot be taken into account upon control system design, and the gain of the compensator cannot be increased.

As described above, the conventional control arrangement has a drawback in at least target value tracking characteristics, and the settling time cannot be greatly shortened. Since disturbance suppression characteristics are not considered in the conventional system, high performance of the system cannot be expected in this respect.

The reason why the prior art cannot provide improvement in this respect will be described below. In essence, it is attributed to the fact that a single-degree-freedom linear compensation is used although an object is nonlinear. Since the conventional arrangement shown in FIG. 3 has an integral arrangement, it has an effect of at least steadily removing a control deviation caused by the dead band by an integral operation.

However, the upper limit of the integral rate of the velocity compensator 7 in this arrangement is low due to the phase characteristics of a transfer function, and high-speed operation cannot be expected. In general, the parameters of the velocity compensator 7 in the arrangement shown in FIG. 3 are set on the basis of only a linear component G(s) for the purpose of stabilizing the velocity loop, and in particular, improving forward characteristics from the target value input to the controlled amount output (to be referred to as single-degree-of-freedom design of the control system hereinafter). For this reason, the velocity compensator 7 has a drawback in that the parameters cannot be set according to a nonlinear component or disturbance.

On the other hand, if only a problem associated with deterioration of response performance under the influence of the dead band is to be taken care of, means based on a nonlinear function is available as a simple method. That is, a nonlinear element 8 shown in FIG. 1 is inserted between the velocity compensator 7 and the dead band characteristics 11 in FIG. 3. This element gives a predetermined bias value at the zero point of an operation amount having a dead band, and the bias value is added in a direction to increase the speed since the sign is taken into consideration. This means can achieve perfect compensation in theory.

However, in practice, since the dead band width of the element 11 varies spatially (in association with the rotor angle in a rotary motor or the mover position on a stroke in a linear motor) and temporally, the means using a fixed compensation amount encounters another problem.

As can be seen from the relationship between the elements 8 and 11, it is strictly inhibited to set the bias value in the element 8 beyond the dead band width of the element 11. If this rule is violated, then the system becomes a self-excited system. Therefore, a condition that the bias value is set to be equal to or smaller than the lower limit of the dead band width is required. In a normal vibration wave motor, a variation in dead band width is as high as about 10% in a rotary motor, and is as high as 20 to 30% in a linear motor. Furthermore, if variations over time, individual differences in manufacturing, and variations in load are taken into consideration, then only a conservative bias value with a margin can be set, and a significant effect cannot be expected by the use of the element 8.

Of course, under the condition that a motor is used in a certain environment and its sufficient individual adjustment is possible, an effect can be expected to some extent by the above-mentioned means. However, such a condition cannot be imposed on mass-production products. Generally speaking, the second problem is a control arrangement with high parameter sensitivity. It is preferable that the control characteristics have low sensitivity, and realization of low sensitivity is an important concept which is also associated with the main theme of the latest control theory.

Upon examination of the control theory, and in particular, general feedback control theory, the necessity of a feedback arrangement is brought about by the fact that a controlled object has uncertainty to begin with. If there is no uncertainty, then only the forward feed control is required. The uncertainty component may include a disturbance input, a parameter variation, and a deviation from linear characteristics, i.e., a nonlinear component. FIGS. 5A to 5C show the concept of this generalized disturbance. FIG. 5A shows an expression of a general controlled object (plant) which is placed in an environment exposed to an input disturbance d and observation noise n, and has a characteristic variation Δ. FIG. 5B shows the equivalent expression of FIG. 5A, and expresses the above-mentioned disturbances as a generalized disturbance. In particular, the above-mentioned dead band characteristics can be illustrated as shown in FIG. 5C, and can also be assumed to be an equivalent disturbance.

The essential problem of the prior art is that the prior art does not comprise any means for positively removing such a disturbance, and this point of view is indispensable especially in a vibration wave motor control system.

As described above, in a conventional vibration wave motor control apparatus, no adequate control means is provided for nonlinear elements such as a dead band and disturbance inputs, and quick response characteristics cannot be realized. In addition, constant control performance cannot be maintained.

SUMMARY OF THE INVENTION

One aspect of the application is to provide a control apparatus for a vibration wave motor, which considers nonlinearity, parameter variation, and the like as a disturbance, and eliminates the influence of the disturbance.

One aspect of the application is to provide, under the above-mentioned object, a vibration wave motor apparatus which has input/output characteristics free from the influence of a disturbance by estimating a disturbance component from output information of a motor corresponding to input operation information to the motor, and negatively feeding back the disturbance component to the input.

One aspect of the application is to provide a motor apparatus which causes the above-mentioned motor free from the influence of the disturbance to execute operation control with respect to a target controlled amount using a feedback loop.

Other objects of the present invention will become apparent from the following description of the embodiments taken in conjunction with the accompanying drawings.

BRIEF DESCRIPTION OF THE DRAWINGS

FIGS. 2A and 2B are block diagrams showing the basic arrangement for connecting a controller and a driving circuit used as a basis for explanation of the principle of the present invention;

DETAILED DESCRIPTION OF THE PREFERRED EMBODIMENTS

Figure 6A:
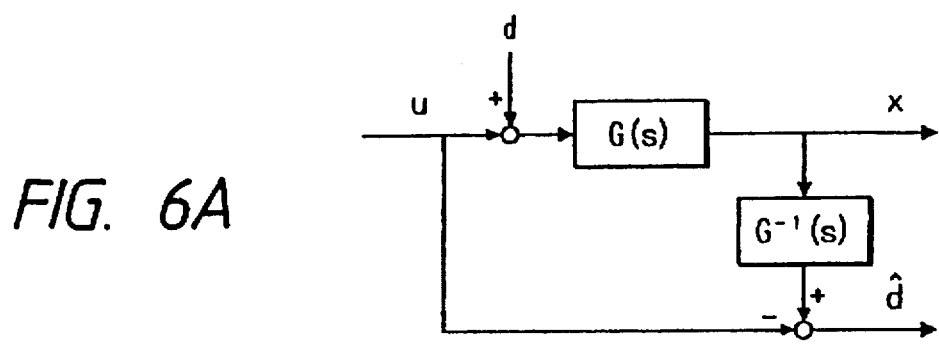
FIGS. 6A and 6B are block diagrams showing the arrangement for estimating and compensating for a disturbance according to the present invention.

FIG. 6A shows the basic concept for estimating a disturbance amount according to the present invention, prior to the description of the embodiments of the present invention. A controlled output amount x should, in principle, correspond to only an operation input u, but is measured as an amount contaminated with a disturbance d. When x is subjected to the inverse characteristics of transfer characteristics G(s) of a controlled object, a sum of u and d is obtained. Since the operation amount u is known, an estimated value d of the disturbance d is obtained by subtracting the operation amount u from the equivalent sum signal. In this case, for the sake of simplicity, it is assumed that the inverse transfer function is present, and can be calculated. A case wherein it is impossible to realize the inverse transfer function will be described later as one of the embodiments.

Figure 6B:
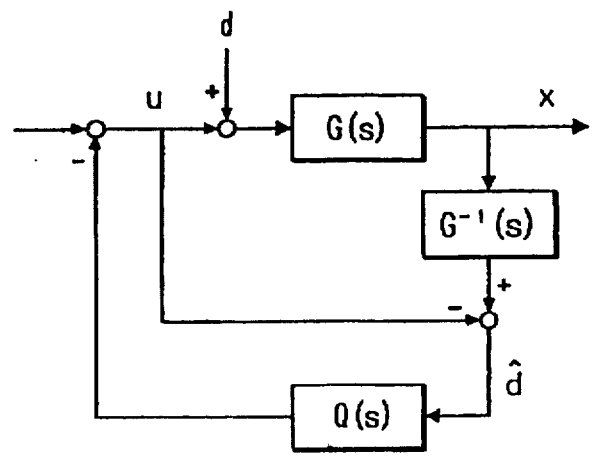

After the disturbance is estimated by the above-mentioned arrangement, the present invention achieves a target output by negatively feeding back the estimated disturbance to the operation amount u. This is the arrangement shown in FIG. 6B. In the feedback path in FIG. 6B, a calculation Q(s) is specified. Briefly speaking, the calculation Q(s) prepares for a frequency limitation(low-pass), and its purpose will be explained later in the description of the embodiments.

The basic concept of the disturbance suppression loop according to the present invention has been described. The present invention adopts an arrangement wherein this disturbance suppression loop is used as an inner loop (first loop), and a second loop for the purpose of velocity control or position control is arranged outside the control loop. With this arrangement, according to the present invention, a compensator can be designed based on only G(s) without considering nonlinearity and disturbance characteristics, and can be adjusted independently of the inner loop. In this sense, a two-degrees-of-freedom control system (a system capable of independently adjusting target value tracking and disturbance suppression) can be realized.

Figure 1:
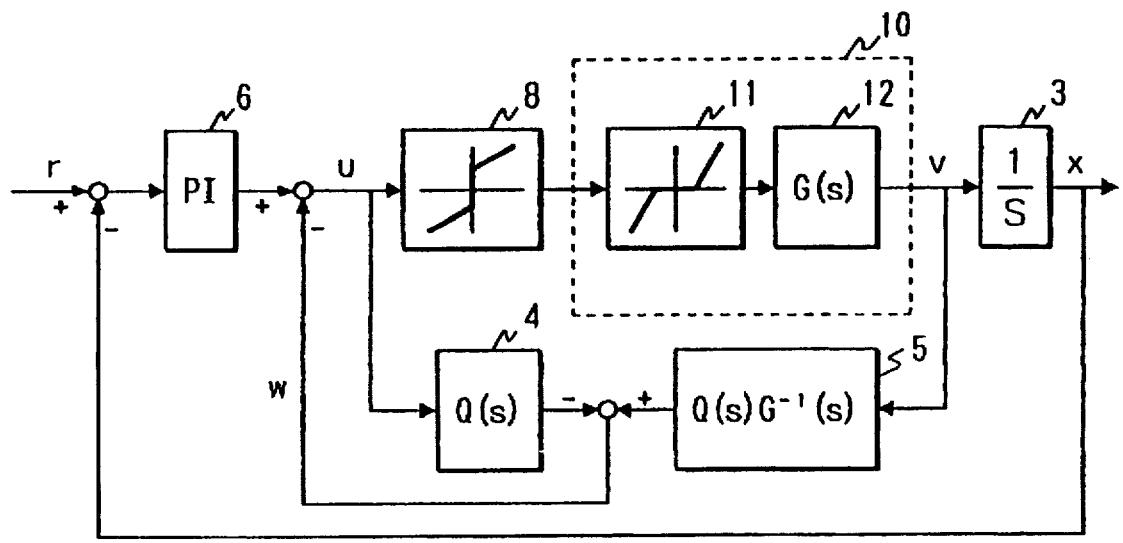
FIG. 1 is a block diagram showing an embodiment of the present invention.
Figure 3:
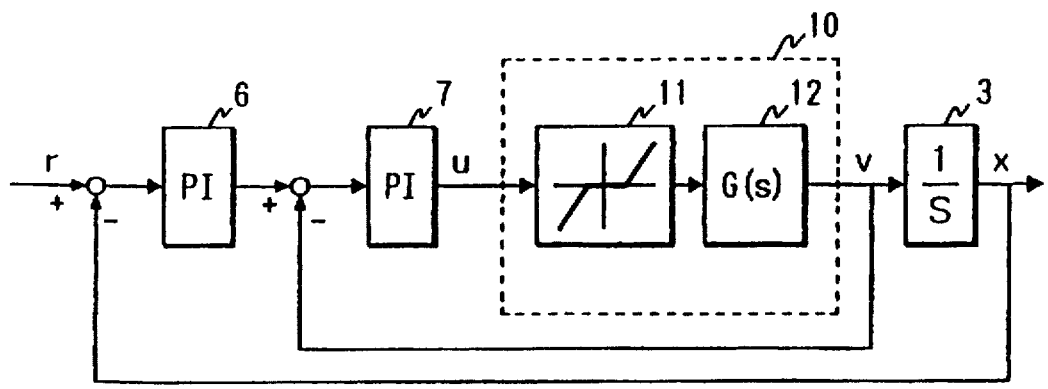
FIG. 3 is a block diagram showing a prior art.
Figure 4A:
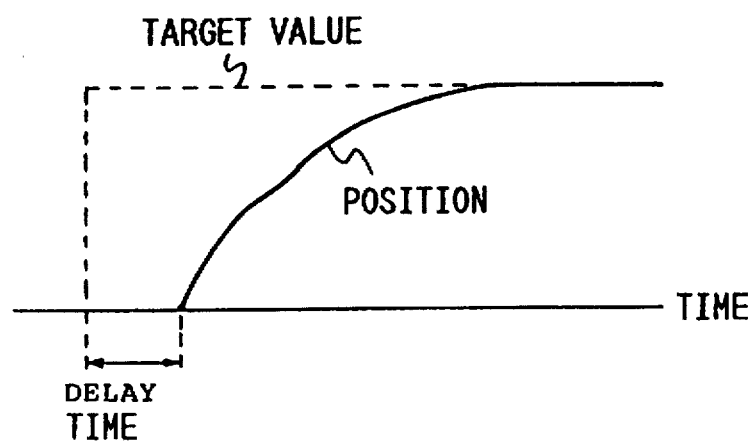
FIGS. 4A and 4B are waveform charts showing step response waveforms of a conventional apparatus and the present invention.
Figure 4B:
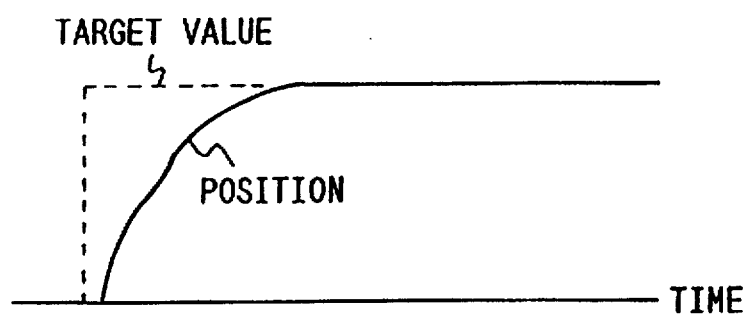

FIG. 1 shows an embodiment of the present invention.

In this embodiment, the above-mentioned dead band compensator 8 is arranged before a controlled object 10 e.g. a vibration wave motor, and a system constituted by the controlled object 10 and the dead band compensator 8 is assumed to be a new controlled object. The input and output of this extended system respectively are an operation amount u and a velocity v. In this case, an ideal state corresponds to a case wherein the transfer characteristics between the input and output are linear characteristics, i.e., are given by only G(s), and the influence of a deviation from G(s) of the actual system is considered as a disturbance.

The principal object of the arrangement of the inner loop is to estimate a disturbance amount from two signals at input and output points u and v of the extended system. The point u comprises a filter 4, and the point v comprises a filter 5. In this signal transfer arrangement, a disturbance amount is estimated by calculating the difference between the output values from these two filters, and the estimated disturbance amount is negatively fed back to the controlled object input point u.

The outer loop is rather a conventional position control feedback loop. In this loop, a position compensator 6 is represented by PI. The loop as a whole shows an embodiment used as a simple case aiming at position control.

The two filters in the inner loop will be described below. The filter 5 for filtering the output value has inverse characteristics of a controlled object linear portion G(s) 12. Q(s) in each of the two filters 4 and 5 provides low-pass characteristics for removing high-frequency components exceeding the band of the controlled object. In the above description of the concept, Q(s) is applied to the comparison result value of the two signals. However, in practice, Q(s) must be equivalently moved to a position before a comparison point as in this embodiment in consideration of realizability of the calculation. The elements 4 and 5 are filters having frequency characteristics, but have significance more than such filters in the closed loop. That is, these filters are arranged for the purpose of so-called robust stabilization (to assure stability against a characteristic variation and noise) in recent control theory, and serve as principal adjustment portions for defining the characteristics of the inner loop. As for the realizability of the calculation, it is defined by the filter 5. The degree of Q(s) is set to be equal to or larger than that of G(s), whereby a pure differential calculation is avoided, and Q(s) can be realized by an integral calculation. Note that the calculation here is not limited to a digital calculation but may be an analog calculation using an operational amplifier, and the like.

In this arrangement, the inner loop plays a role for improving disturbance suppression characteristics, and the outer loop plays a role for improving position command value tracking characteristics. Furthermore, these loops realize a two-degrees-of-freedom control system which does not cause an interference between the two characteristics, and can independently adjust those characteristics. More specifically, in the inner loop, Q(s) is set in consideration of only nonlinearity and original disturbance characteristics, and in the outer loop, the compensator 6 is designed based on only the transfer function G(s).

The nonlinear compensator 8 plays a supplementary role in this embodiment. Upon arrangement of the inner disturbance compensation loop, the compensator 8 can compensate for a drawback associated with high parameter sensitivity, and can provide an effect of improving startup characteristics. A limiting condition associated with the setting of the bias value in element 8 is no longer required, and a representative value of the dead band width need only be set.

In the above-mentioned arrangement, a motor is driven at a velocity v as a motor output corresponding to an operation amount u. In this case, a sum of the operation amount u and a disturbance d included in this system is obtained via an inverse function $G^{-1}(s)$ of the transfer function G(s) (a motor characteristic function for determining the value of the motor output v upon input of the operation amount u) of the motor, and the operation amount u input via the filter 4 is subtracted from the sum of the operation amount u and the disturbance d, thus extracting only the disturbance d as w. The disturbance component w is canceled from the operation amount u. In this arrangement, even when a disturbance is input to the motor control system, and the motor velocity which should be $v_1$ corresponding to an input operation amount $u_1$ undesirably becomes a velocity $v_2$, since the disturbance component can be canceled from the operation amount, the motor can be driven with a correct output $v_1$ corresponding to the input operation amount $u_1$.

Figure 11:
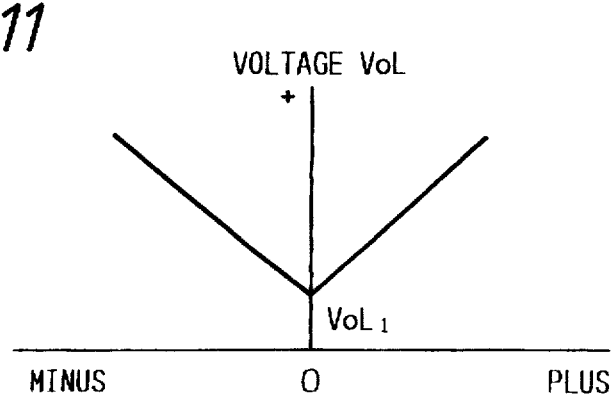
FIG. 11 is a waveform chart for explaining the operation of the present invention shown in FIG. 1.

A detailed description will be given below. When the operation amount u is input to the control circuit of the motor, the element 8 gives a predetermined bias $VoL_1$ to the operation amount u when the operation amount is zero. Since the motor is assumed to be a vibration wave motor, it is also assumed that frequency voltages having a 90° phase difference therebetween are applied to piezoelectric elements used as first and second groups of electro-mechanical energy conversion elements arranged at different positions on a vibrating member of the motor, and the voltage value is varied in accordance with the operation amount u. The relationship between the operation amount u and the frequency voltage value is assumed to be as shown in FIG. 11. More specifically, when the operation amount u is 0, a voltage $VoL_1$ is given, and the voltage VoL symmetrically linearly increases from $VoL_1$ in accordance with a displacement, in the plus or minus direction, of the operation amount u. When the operation amount assumes a value in the plus direction, a phase angle of +90° is given as the above-mentioned phase difference; when it assumes a value in the minus direction, a phase angle of −90° is given as the phase difference. The element 8 sets the bias $VoL_1$ when the operation amount u is zero. The controlled object 10 is constituted by the motor and a driving circuit, and the object 10 is assumed to adopt the arrangement shown in FIG. 2A together with the element 8. In a signal converter 1 in FIG. 2A, no bias is given. However, when the arrangement shown in FIG. 1 is adopted an element for giving the above-mentioned bias is assumed to be added into the signal converter 1. With this arrangement, the phase difference and the voltage value VoL of the frequency voltage change in accordance with the setting value of the operation amount u, thereby controlling the direction and velocity of the motor.

The transfer function G(s) represents the characteristics of the driving circuit for determining the velocity characteristics as the motor output in accordance with the voltage value VoL. In this arrangement, since the motor output is extracted via the filter 5, a sum of a disturbance and an operation amount at that time is obtained, and when the output from the filter 4 is subtracted from the sum, the disturbance component can be extracted. When the disturbance component is subtracted from the operation amount, the output characteristics, free from the influence of the disturbance, of the motor corresponding to the operation amount can be realized.

An element 3 is an integral element and is arranged to calculate a driving amount x based on the output velocity v of the motor. More specifically, an output from, e.g., an encoder attached to a rotor shaft is adopted, and position information (the displacement position of an object to be driven by the motor) of the motor is obtained. Further, instead of the encoder, an integral circuit is also available in which the velocity v is integrated and the driving amount x is obtained. The driving amount x is compared with target position information r, and the value of the operation amount u is adjusted as the output from the element 6 in accordance with the comparison result. For example, when the motor is started up, since the difference between r and x is large, the value u is set to be large. When r and x become close to each other, the value u is gradually decreased. When r and x coincide with each other, the value u is set to be zero to stop the motor. In this manner, position feedback control is executed.

In the above description, the vibration amplitude control shown in FIG. 2A has been exemplified. Also, in the case of frequency control shown in FIG. 2B, similar control is executed. In this case, a signal converter 2 can be arranged as follows. That is, when the operation amount u is zero, a startup initial frequency is set, and the frequency is decreased in accordance with an increase in absolute value of the operation amount.

In the above description, the velocity v is input to the filter 5 as the motor output. Alternatively, the output from a piezoelectric element, arranged on the vibrating member, for detecting a vibration may be adopted as the motor output, and may be input to the filter 5.

Furthermore, when a feedback loop for comparing the velocity v and a target velocity, and increasing/decreasing the value of the operation amount u in accordance with the comparison result is added after the element 6, constant velocity control can be realized.

Embodiment 1

As another embodiment, a case will be exemplified below wherein the arrangement method of the inner loop filters is essentially different.

In the above embodiment, the description has been made under the condition that the inverse transfer function of G(s) is realizable. The filter 5 in FIG. 1 requires the inverse transfer function. Some general controlled objects have transfer functions which cannot have any inverse functions. A class of such controlled objects is called a nonminimum phase system. That is, this system corresponds to a case wherein if G(s) is given by:

$$G(s)=N(s)/D(s) \quad (1)$$

then, N(s) has an unstable zero (the root of the right half complex plane). Note that N(s) and D(s) respectively express the numerator and denominator of G(s) as integral polynomials since G(s) is a rational polynomial. In addition, D(s) is tacitly stable. In this case, 1/N(s) is associated with the method of getting around the problem when a calculation is impossible to realize.

Figure 7:
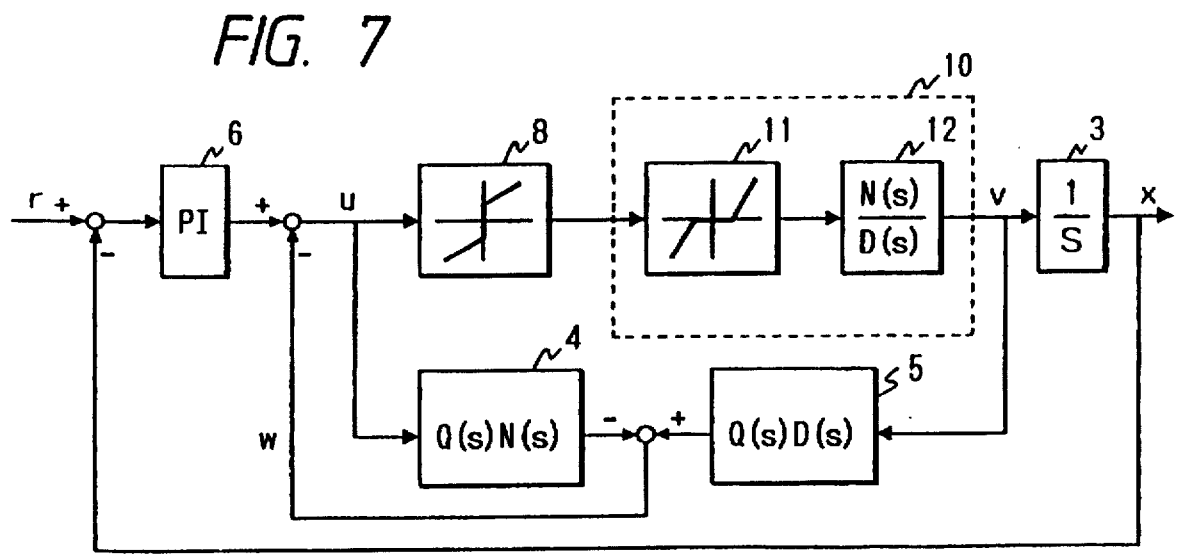
FIG. 7 is a block diagram showing another embodiment of the present invention.

FIG. 7 shows its realization method and embodiment.

A plant expression is given by equation (2):

$$v=\{N(s)/D(s)\}(u+d) \quad (2)$$

A disturbance d is to be estimated from a velocity v and an operation amount u without using an inverse function of N. Filter calculations according to FIG. 7 are:

$$y1=Q(s)D(s)v \quad (3)$$

$$y2=Q(s)N(s)u \quad (4)$$

Then, y1 and y2 as the outputs from these filters are compared using equation (5):

$$w = y1 - y2 \quad (5)$$

$$= QD(N/D)(u + d) - QNu$$

$$= QNd \quad (6)$$

w as equation (6) obtained as a result of the comparison can be assumed to be the estimated value of the disturbance d. In this case, the frequency characteristics QN must be adjusted by Q to be desired ones.

FIG. 7 consequently has the same signal transfer arrangement as in FIG. 1. However, the filters 4 and 5 have different internal arrangements to extend the class of objective transfer functions.

In the above description, the numerator polynomial N(s) is collectively processed, but may be limited to only factors which cannot have any inverse functions. In this case, stable factors of N(s) are included in D(s), thus allowing the same description as above.

Embodiment 2

Figure 8A:
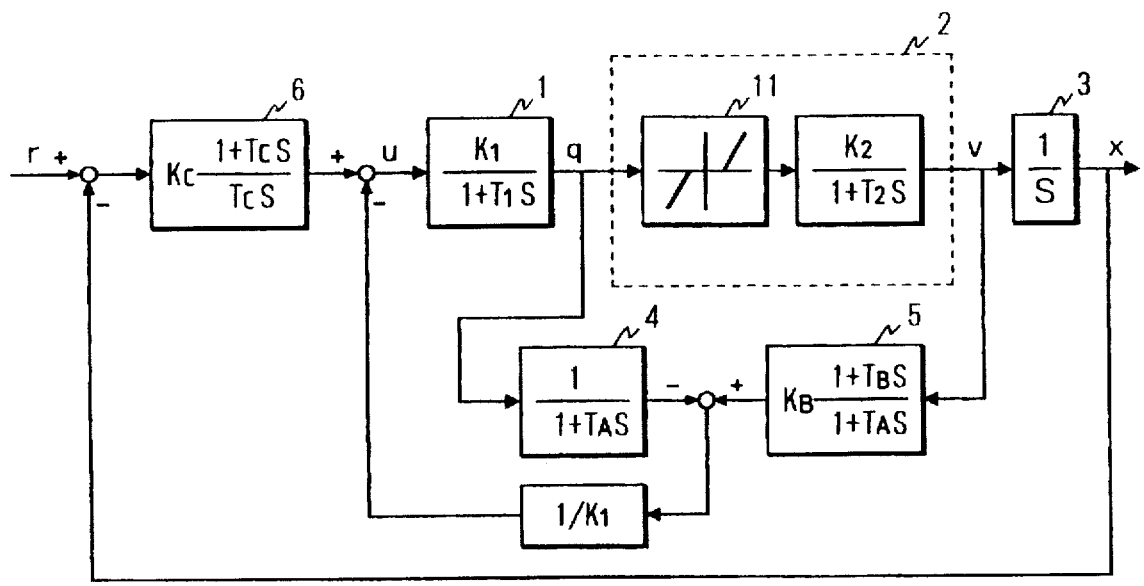
FIGS. 8A and 8B are block diagrams showing still another embodiment of the present invention.
Figure 8B:
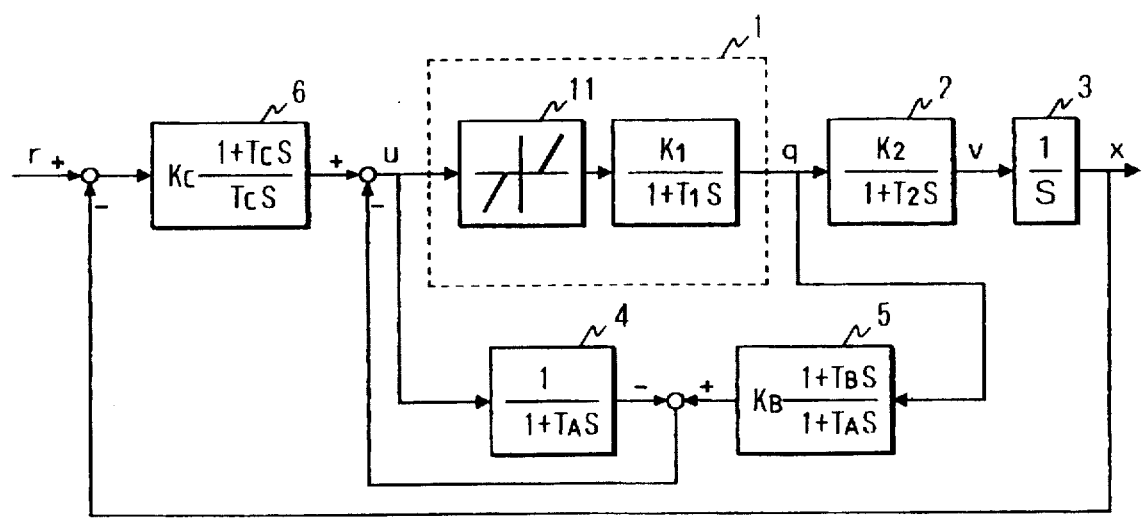

In some vibration wave motors, the vibration amplitude can be detected as internal information. Such a motor comprises a detection piezoelectric element for vibration detection on a stator used as a vibrating member, and mechanical vibration can be observed as an output voltage from this detection piezoelectric element. The amplitude amount of the observed vibration is located at a position between an operation amount to a velocity in the flow of physical information. FIGS. 8A and 8B show an embodiment which effectively utilizes this information. In this embodiment, all linear elements are represented by primary systems. Two different arrangement methods can be selectively used depending on whether the dead band characteristics are present before or after amplitude information q. More specifically, FIG. 8A corresponds to a case wherein a dead band element is located between the amplitude q and the velocity v, and FIG. 8B corresponds to a case wherein the dead band element is located between the operation amount u and the amplitude q. For example, in the former case, a frictional force loss in a very small vibration state is considered as the major factor of the dead band, and in the later case, a voltage loss at a very weak current is considered as the major factor of the dead band in association with the electrostatic capacitance characteristics of a stator exciting vibration device.

As a result, since the feedback system of the internal status amount as the amplitude amount is realized, a control system with high response characteristics can be provided.

Embodiment 3

Figure 9:
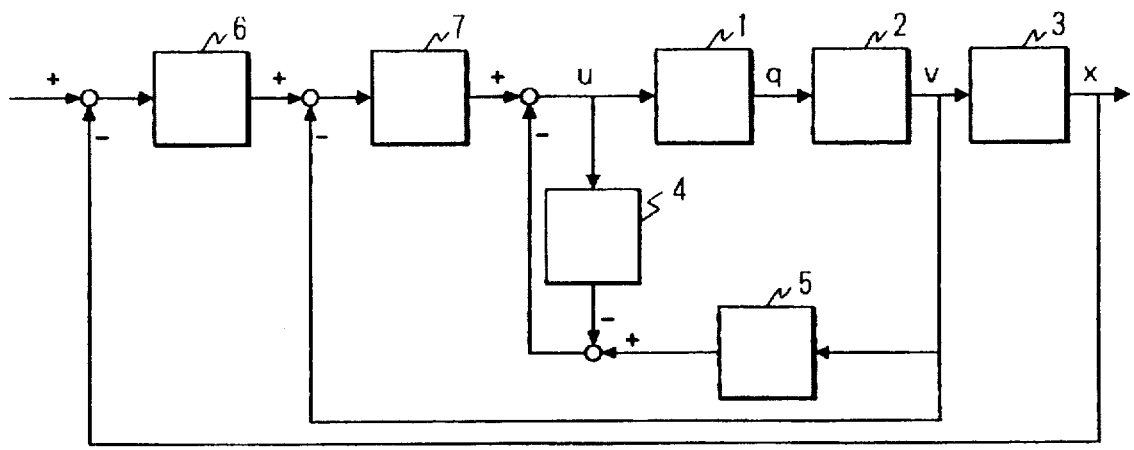
FIG. 9 is a block diagram showing still another embodiment of the present invention.

In the embodiment shown in FIG. 9, a velocity characteristic compensation loop is added to the embodiment shown in FIG. 1. Although the present arrangement is complicated, high performance can be attained.

In the embodiment shown in FIG. 1, a two-degrees-of-freedom system is realized as a position control system. In this embodiment, two-degree-freedom adjustment in disturbance control means (4, 5) and velocity control means (7) is allowed as a velocity control system. Position control means (6) is adjusted depending on velocity control.

Embodiment 4

Figure 10:
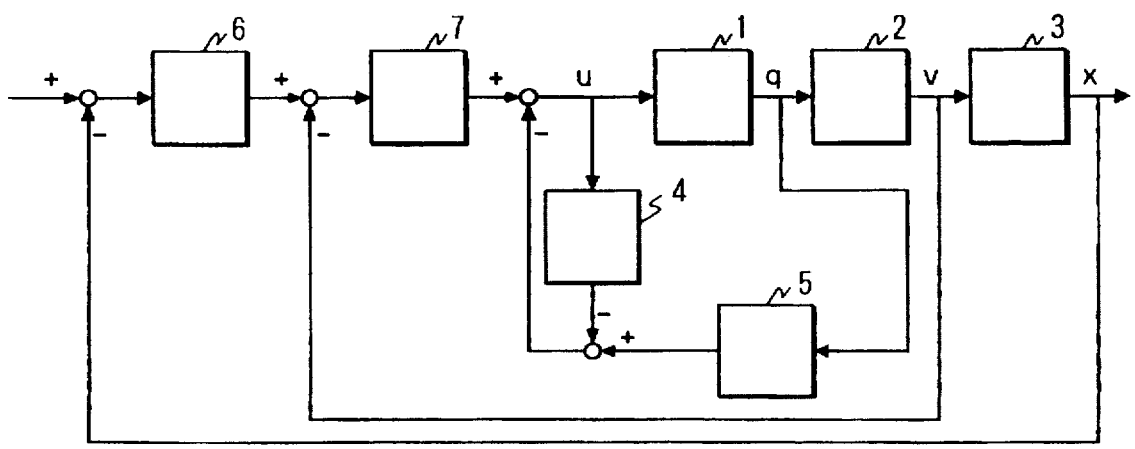
FIG. 10 is a block diagram showing still another embodiment of the present invention.

FIG. 10 shows an embodiment wherein a vibration amplitude is utilized in place of a velocity signal in the disturbance compensation loop of the arrangement shown in FIG. 9. In this arrangement, an importance is placed on suppression of a disturbance in an internal system from a driving circuit to a stator vibration generation mechanism. Since the dynamical resonance characteristics of the stator, nonlinear characteristics of an oscillator, a power amplifier, and a pulse modulator in some cases in the driving circuit, and the like are closed by the inner loop, the linearity of this portion as a unique feature of an ultrasonic motor can be improved.

On the other hand, a movable member portion outside the inner loop corresponds to characteristics as a known dynamic equation, and can be easily closed by conventional velocity and position control loops, thus allowing to seek for desired control performance.

As described above, according to the present invention, in a control system having dead band characteristics and variation characteristics, which system is especially represented by a motion control system using a vibration wave motor, a disturbance input, a nonlinear component, and a temporal change component can be suppressed by feedback control, and target value tracking performance can be improved. Since the arrangement is simple, and only feedback control is used, parameter adjustment is facilitated, and no fine adjustment for individual differences is required. Therefore, total costs associated with design, manufacture, and adjustment can be reduced, and a high-performance control apparatus can be provided with low cost.

As the motor, a rotor may be driven using a vibration wave as a driving force, a vibrating member (motor apparatus) itself may be moved with respect to a contact member, or a contact member such as a paper sheet may be directly moved by a vibration wave generated by a vibrating member without using a rotor.

What is claimed is:

1. A vibration wave motor apparatus, which forms a vibration wave in a vibrating member by applying a frequency voltage signal to an electro-mechanical energy conversion element arranged on the vibrating member, and uses the vibration wave as a driving force, said vibration wave motor apparatus comprising:

input means for setting an input value corresponding to an operation amount of the vibration wave motor apparatus;

a driving circuit that controls a frequency or a voltage level of the frequency voltage signal applied to said electro-mechanical energy conversion element on the basis of an input value set by said input means, wherein said driving circuit determines an output characteristic value corresponding to the input value in accordance with a power transfer function;

an estimation circuit, including a conversion processing circuit having a conversion characteristic which relates to the power transfer function, that converts an actual output of the vibration wave motor apparatus to a converted value by utilizing the conversion processing circuit to estimate a disturbance component value on the basis of a difference between the converted value and the input value set by said input means; and a disturbance suppression feedback loop that negatively feeds back the disturbance component value estimated by said estimation circuit to one of said driving circuit and said input means.

2. A vibration wave motor apparatus according to claim 1, further comprising a second feedback path that determines an information value to be input to said input means in accordance with a difference between the actual output value and a target value of the vibration wave motor apparatus.

3. A vibration wave motor apparatus according to claim 2, wherein the actual output value represents position information of an object driven by the vibration wave motor apparatus, and the target value represents target position information.

4. A vibration wave motor apparatus, which forms a vibration wave in a vibrating member by applying a frequency voltage signal to an electro-mechanical energy conversion element arranged on the vibrating member, and uses the vibration wave as a driving force, the vibration wave motor apparatus comprising:

an input device that sets an input value corresponding to an operation amount of the vibration wave motor apparatus;

a driving circuit that controls a frequency or a voltage level of the frequency voltage signal applied to the electro-mechanical energy conversion element on the basis of the input value set by said input device;

an estimation circuit that monitors an actual output of the vibration wave motor apparatus, and estimates a disturbance component value of the vibration wave motor apparatus by applying a conversion process to the actual output of the vibration wave motor apparatus to obtain a converted value, and comparing the converted value to the input value set by said input device, the conversion process having a conversion characteristic relative to a power transfer function of the vibration wave motor apparatus; and a disturbance suppression feed back loop that negatively feeds back the disturbance component value estimated by said estimation circuit to said input device or said driving circuit.

* * * * *

UNITED STATES PATENT AND TRADEMARK OFFICE
CERTIFICATE OF CORRECTION

PATENT NO. : 5,736,822
DATED : April 7, 1998
INVENTOR(S) : REIJI MITARAI, ET AL.

It is certified that error appears in the above-indentified patent and that said Letters Patent is hereby corrected as shown below:

On the title page, item [56], insert the following:

U.S. Patent Documents

"5,159,253  10/1992  Shimizu" should read
--5,159,253  10/1992  Shimizu, et al.--.

Column 2

Line 1, "addition" should read --addition to--.

Column 4

Figure 5A:
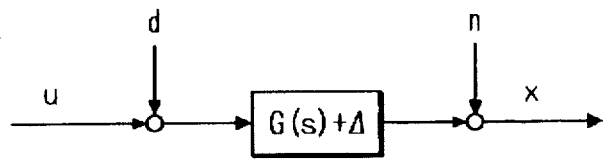
FIGS. 5A to 5C are block diagrams for explaining the concept of a generalized disturbance.
Figure 5B:
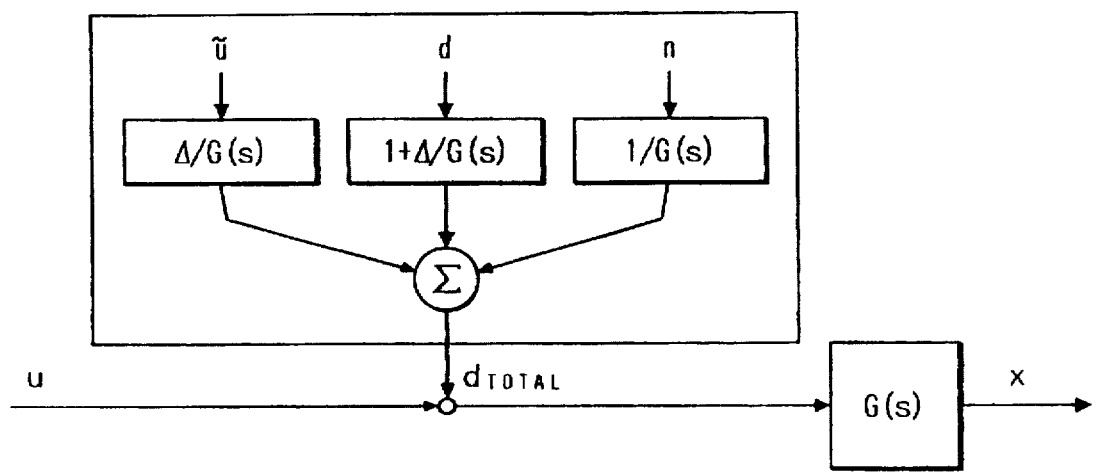
Figure 5C:
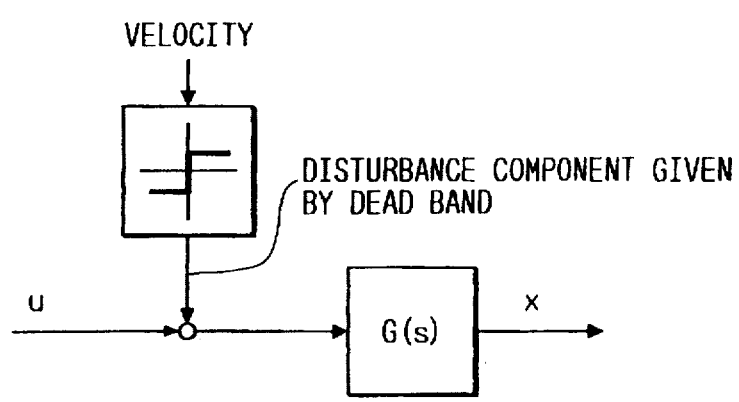

Line 26, "invention; FIGS. 5A" should read --invention; ¶ FIGS. 5A--.

Column 5

Line 16, "controlled object 10 e.g." should read --controlled object 10, e.g.,--.

Column 6

Line 62, "adopted" should read --adopted,--.

UNITED STATES PATENT AND TRADEMARK OFFICE
CERTIFICATE OF CORRECTION

PATENT NO. : 5,736,822

DATED : April 7, 1998

INVENTOR(S) : REIJI MITARAI, ET AL.

It is certified that error appears in the above-indentified patent and that said Letters Patent is hereby corrected as shown below:

<u>Column 8</u>

Line 58, "later" should read --latter--.

<u>Column 9</u>

Line 5, "two-degree-freedom" should read --two-degrees-of-freedom--.

Signed and Sealed this

Twenty-seventh Day of October, 1998

Attest:

BRUCE LEHMAN

*Attesting Officer*   *Commissioner of Patents and Trademarks*